(12) United States Patent
Rebiere et al.

(10) Patent No.: US 11,329,752 B2
(45) Date of Patent: May 10, 2022

(54) RECONFIGURABLE OPTICAL BACKPLANE

(71) Applicant: LATELEC, Toulouse (FR)

(72) Inventors: Yoann Rebiere, Ramonville (FR); Alexandre Bacou, Saint Porquier (FR)

(73) Assignee: LATELEC, Toulouse (FR)

( * ) Notice: Subject to any disclaimer, the term of this patent is extended or adjusted under 35 U.S.C. 154(b) by 0 days.

(21) Appl. No.: 17/416,860

(22) PCT Filed: Dec. 20, 2019

(86) PCT No.: PCT/EP2019/086792
§ 371 (c)(1),
(2) Date: Jun. 21, 2021

(87) PCT Pub. No.: WO2020/128040
PCT Pub. Date: Jun. 25, 2020

(65) Prior Publication Data
US 2022/0029728 A1    Jan. 27, 2022

(30) Foreign Application Priority Data

Dec. 21, 2018 (FR) ..................................... 1873949

(51) Int. Cl.
*H04B 10/00* (2013.01)
*H04J 14/02* (2006.01)
*H04J 14/00* (2006.01)

(52) U.S. Cl.
CPC ...... *H04J 14/0212* (2013.01); *H04J 14/0267* (2013.01); *H04J 14/0278* (2013.01)

(58) Field of Classification Search
CPC .... H04J 14/02; H04J 14/0201; H04J 14/0202; H04J 14/021; H04J 14/0212;
(Continued)

(56) References Cited

U.S. PATENT DOCUMENTS

| 5,612,805 A | * | 3/1997 | Fevrier | H04J 14/0204 398/83 |
| 2008/0080865 A1 | * | 4/2008 | Muro | H04J 14/0204 398/83 |
| 2012/0230681 A1 | * | 9/2012 | Ueki | H04J 14/0256 398/34 |

FOREIGN PATENT DOCUMENTS

| EP | 0687085 A1 | 12/1995 |
| WO | 9960740 A1 | 11/1999 |

OTHER PUBLICATIONS

C-S Li et al., Automatic Fault Detection, Isolation, and Recovery in Transparent All-Optical Networks, J. Lightwave Tech., Oct. 1, 1997, pp. 1784-1793, vol. 15, No. 10, IEE, USA.

(Continued)

*Primary Examiner* — Daniel G Dobson
(74) *Attorney, Agent, or Firm* — Im IP Law; Chai Im; C. Andrew Im

(57) ABSTRACT

An optical backplane for an optical communication network architecture distributing data to equipment. An optical demultiplexer having an input port and at least two output ports. The input port coupled to an optical fiber to carry at least two multiplexed channels of different wavelengths, a control/management channel to control/manage the network and a service dedicated channel. The output ports deliver the control/management channel and at least one service dedicated channel. A coupler receives and transmits one portion of the control/management channel to an interface box coupled to an item of equipment, and another portion of said channel to an optical multiplexer. A routing device for each output port receives a channel either to transmit said channel to the optical multiplexer in a first position or to transmit one portion of said channel to the interface box and another portion of said channel to the optical multiplexer in a second position.

6 Claims, 1 Drawing Sheet

(58) Field of Classification Search
CPC .............. H04J 14/0213; H04J 14/0215; H04J 14/0219; H04J 14/022
See application file for complete search history.

(56) References Cited

OTHER PUBLICATIONS

Mari W. Maeda, "Management and Control of Transparent Optical Networks," J. Selected Areas in Comm., Sep. 1, 1998, pp. 1008-1023, vol. 16, No. 7, IEEE, Piscataway, USA.

* cited by examiner

RECONFIGURABLE OPTICAL BACKPLANE

RELATED APPLICATIONS

This application is a § 371 application of PCT/EP2019/086792 filed Dec. 20, 2019, which claims priority from French Patent Application No. 18 73949 filed Dec. 21, 2018, each of which is incorporated herein by reference in its entirety.

FIELD OF THE INVENTION

The present invention relates to a backplane. In particular, the invention relates to a reconfigurable optical backplane. The optical backplane can be part of an optical communication network that can in particular be onboard a means of transport so as to allow for the communication of equipment together.

The invention has in particular an advantageous application in the aeronautics field, in particular for equipping passenger cabins of an aircraft.

BACKGROUND OF THE INVENTION

In order to interconnect the equipment of an aircraft cabin together for the purposes of communication, current aircrafts are equipped with much and different wiring that forms a communication network of which the installation and the maintenance can be complex.

The wiring, mainly electrical, is thus generally installed all along the cabin in zones that are sometimes difficult to access, generally disposed under the floor or in the ceiling. This wiring furthermore has to be perfectly maintained and protected, in particular from aggressions that are able to damage it, such as for example vibrations, splashes of liquid, high temperatures, electromagnetic radiation, etc.

In addition, each item of equipment that distributes data to the cabin uses specific wiring according to the desired application. A point-to-point connection of the wiring from the avionic cabinets has to be carried out.

Moreover, when an airline has to proceed with a retrofit of the cabin of the aircraft, all or a portion of this wiring has to be replaced, inducing substantial maintenance time and immobilisation cycles of the aircraft.

This wiring consequently has a substantial cost, whether in terms of price, in terms of installation time, maintenance, or in terms of weight, as the weight affects the mass balance of the aircraft.

In addition, the network such as it is carried out currently in aircrafts is not well suited to modifications (for example, adding new items of equipment in order to propose new services to the passengers). The physical topology of the network is frozen.

Optical network architectures are beginning to appear, replacing cables with optical fibers in order to transmit the data. However, the network obtained does not always allow for significant adaptability.

OBJECT AND SUMMARY OF THE INVENTION

The present invention aims to remedy the aforementioned disadvantages.

For this purpose, an optical backplane for an optical communication network architecture distributing data to equipment is proposed by the present invention. Said backplane includes an optical wavelength demultiplexer including:

an input port configured for being coupled to an optical fiber for carrying at least two multiplexed channels of different wavelengths, a wavelength channel carrying data concerning a control and management of the optical communication network, referred to as control and management channel, and at least one wavelength channel carrying data concerning a service for at least one item of equipment, referred to as a channel dedicated to a service, and at least two output ports configured to deliver, each, respectively the maintenance channel and the at least one service channel. The data concerning the control and the management of the optical communication network, carried by the control and management channel, in particular concerns data relating to the maintenance of the optical communication network and to the configuration/reconfiguration of the optical communication network formed by the optical fiber.

Said backplane further includes:
an optical wavelength multiplexer,
a first coupler configured to receive the control and management channel and transmit a portion of the control and management channel to an interface box coupled to at least one item of equipment, and another portion of the control and management channel to the optical wavelength multiplexer,
a routing device for each output port of the optical wavelength demultiplexer delivering a channel dedicated to a service, the/each routing device being configured to: receive the channel dedicated to a service; and transmit, when it is in a first position, said channel dedicated to a service to the optical wavelength multiplexer, and when it is in a second position, a portion of said channel dedicated to a service to the interface box coupled to at least one item of equipment, and another portion of said channel dedicated to a service to the optical wavelength multiplexer, and
the optical wavelength multiplexer being configured to combine the control and management channel and the at least one channel dedicated to a service received and wavelength-division multiplex them onto the optical fiber.

The first coupler is configured to receive the control and management channel from a first output port of the optical demultiplexer (51).

The knowledge of the need for an item of equipment for such and such a service is recorded in the data concerning the configuration/reconfiguration of the optical communication network carried by the control and management channel.

According to the services proposed and transported by the optical fiber, and according to the needs of the items of the equipment associated with the optical backplane, said optical backplane advantageously makes it possible to transmit or not, via the routing device, the service to the item of equipment. The routing device switches to a second position when the item of equipment needs the service proposed. The routing device switches to the first position when the item of equipment does not need the service proposed.

Such an optical backplane thus advantageously participates in the configuration/reconfiguration of the optical communication network without modifying the optical communication network architecture to which it is attached. It makes it possible to thus sustain the optical communication network architecture and to offer greater adaptability to the modifications (adding new items of equipment, for example).

Such an optical backplane advantageously participates in the distribution of multiple services to several items of equipment.

According to particular embodiments, the method according to the invention furthermore meets the following characteristics, implemented individually or in each one of their technically permissible combinations.

In particular embodiments of the invention, the/each routing device is intended and configured for switching in the first to the second position, and reciprocally, on instruction from the interface box. The control and management channel includes in particular the data concerning the configuration and/or reconfiguration of the optical communication network, in particular the information concerning the needs of each item of equipment, associated with the optical communication network architecture, with respect to such and such service proposed. This information results for example in information for controlling each routing device. Thus, when the interface box receives said data by the control and management channel, according to the information contained, said box transmits a control signal to said routing device so that it switches from the first to the second position or inversely.

In particular embodiments of the invention, the/each routing device includes a switch 1×2 and two optical couplers 2×1 an optical coupler at each output port of the switch. Preferably, the/each routing device includes only one switch 1×2 and two optical couplers 2×1 an optical coupler at each output port of the switch.

The backplane including conventional optical components (demultiplexer, multiplexer, optical couplers, switch, etc.), the backplane thus has an advantage in terms of design, cost and weight.

In particular embodiments of the invention, the demultiplexer, the multiplexer, the first coupler and the/each routing device are integrated into a photonic integrated circuit. An optical backplane thus carried out has a further advantage in terms of weight, but also in terms of congestion (small size).

The invention also relates to an optical communication network architecture, intended for distributing data to items of equipment, including a distribution box for allocating data concerning services and for the control and management of the optical communication network on multiplexed different wavelength channels over an optical fiber and optical backplanes in accordance with at least one of their embodiments. The optical fiber successively serves each optical backplane. Said backplanes are each coupled to an interface box intended to be coupled to at least one item of equipment. It is clear that the distribution box, the optical fiber, the backplanes and the interface boxes form the optical communication network architecture.

Such an optical communication network architecture is sustainable. New items of equipment can be connected to it and/or new services can be proposed to the connected equipment without requiring modification of the architecture. The new items of equipment are advantageously connected, via the interface boxes, to the backplanes already present in the architecture.

The new services proposed are transmitted via the allocation of these services to a new wavelength in the main optical fiber.

Such an optical communication network architecture also advantageously participates in the maintenance of the optical communication network. The control and management channel includes in particular data relating to the maintenance of the optical communication network. This data in particular integrates data on the state of health of the main optical fiber as well as on the state of health of the backplanes 50. This state of health of the main optical fiber and of the backplanes can be example be controlled by Optical Time Domain Reflectometry (OTDR) or by Optical Frequency Domain Reflectometry (OFDR). In particular embodiments of the invention, an interface box is electrically connected to one/each routing device of the associated backplane in order to control it according to the data contained in the control and management channel received by said interface box.

Such an optical communication network architecture can preferably equip an aircraft.

BRIEF DESCRIPTION OF THE DRAWINGS

The invention shall be understood better when reading the description hereinafter, given by way of example that is in no way limiting, and given in reference to the accompanying drawings.

DETAILED DESCRIPTION OF AN EMBODIMENT OF THE INVENTION

The present invention relates to an optical backplane 50.

The optical backplane 50 can advantageously be inserted into an optical communication network architecture 20.

The optical communication network architecture 20 can, generally, equip any means of transport, in particular those in the aeronautic, rail or automobile fields, without this being a restriction of the invention. It can also be considered installing such an optical communication network architecture in buildings.

The invention is descried in the particular context of one of its preferred fields of application wherein the optical backplane and the associated optical communication network architecture are onboard a civilian aircraft. Nothing excludes however disposing the optical backplane and the associated optical communication network architecture in any other type of aircraft, whether civilian or military.

This optical communication network architecture 20 can be integrated into a data management structure.

Figure 1:
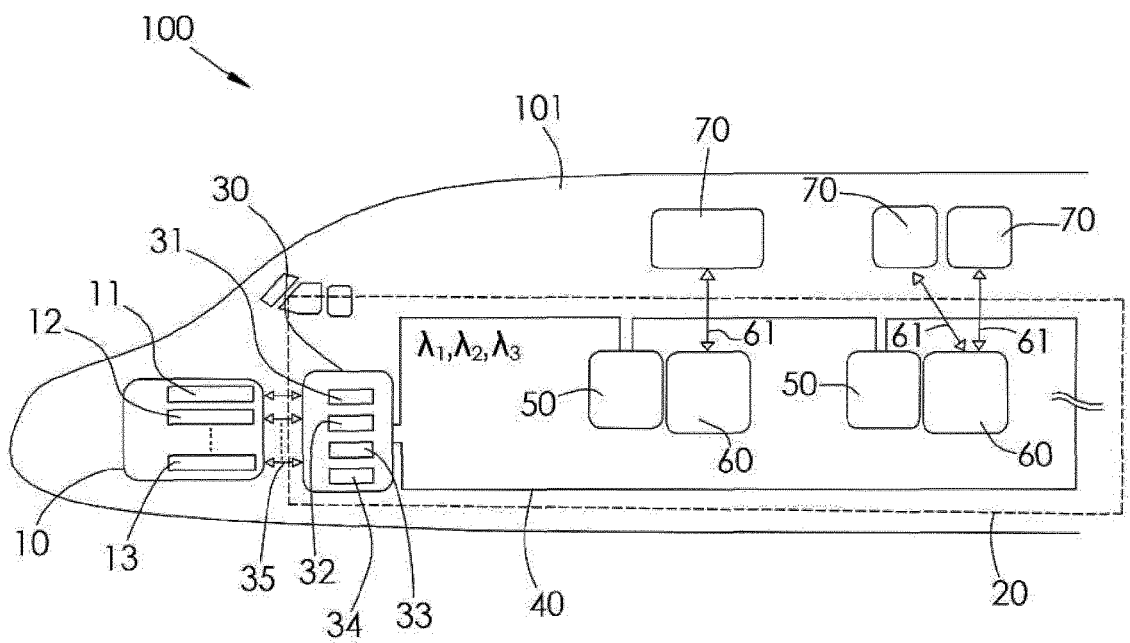
FIG. 1 shows an example of a data management structure onboard a plane.

FIG. 1 diagrammatically shows an example of a data management structure onboard a plane 100. The plane 100 includes, conventionally, a cabin 101 to receive the passengers and is equipped, among other things, with passenger seats (not shown in the figures).

The data management structure is intended for allowing a transmission of data to and from items of equipment 70.

The items of equipment 70 can be of various natures:
terminals (fixed screens) integrated into the passenger seats,
PEDs (personal electronic devices), belonging to the passengers, and
critical and non-critical technical equipment for the flight (pump actuators, temperature or pressure detectors, decoding/encoding units, cooking devices in galleys, etc.).

All of these items of equipment 70 is preferably disposed in the cabin 101.

The data management structure includes: a data resource block 10, and the optical communication network architecture 20.

The data resource block 10 preferably includes:

a central unit, referred to as central maintenance unit 13, and at least one central unit, referred to as central service unit 11, 12.

A central service unit 11, 12 groups together and manages the data concerning a specific service in the plane.

In an embodiment, a service is associated with an entertainment system, known as IFE (In Flight Entertainment), in particular in liaison with the terminals.

In another embodiment, a service is associated with a communications system (internet, for example), in particular in liaison with the terminals and the PED equipment.

In another embodiment, a service is associated with a cabin system, in particular in liaison with the technical equipment that is critical and/or non-critical for the flight.

The central maintenance unit 13 groups together the data concerning the maintenance of the optical communication network and the configuration and/or reconfiguration of the optical communication network. Preferably, the data resource block 10 includes a single central maintenance unit 13 and at least one central service unit 11, 12.

In the non-limiting example of FIG. 1, the data resource block 10 comprises a central maintenance unit 13 and two central service units 11, 12.

The data resource block 10 is preferably disposed in an avionic bay of the plane. The data resource block 10 for example has the form of several data servers.

The optical communication network architecture 20 allows for the distribution, in the cabin 101, of downstream flows and of upstream flows in and from items of equipment 70 of the cabin 101.

The downstream flows allow the items of equipment 70 to use the data coming from said central maintenance 13 and service 11, 12 units and the upstream flows makes it possible to transfer data to said central maintenance 13 and service 11, 12 units from said items of equipment.

The optical communication network architecture 20 includes a distribution box 30 to generate the distribution of downstream data flows.

According to the two-directional transfers, said distribution box communicates, on the one hand, electrical signals (double arrows 35) with the central units 11, 12, 13 from the data resource block 10 and, on the other hand, via an optical fiber, referred to as main optical fiber 40, optical signals with interface boxes 60 coupled with the items of the equipment 70 of the cabin 101. The main optical fiber forms for example a loop of the optical communication network on the distribution box 30. The optical communication network is integrated, according to different embodiments, into the ceiling and/or into the floor of the cabin 101.

In a preferred embodiment, such a distribution box 30 integrates signal processing units:
- a switching unit 31 for routing the electrical signals generated by the data resource block according to the items of equipment,
- a unit 32 for the two-directional conversion of the switched electrical signals into optical signals, and
- a unit 33 for managing optical signals by parameters for wavelength-division allocation and for distribution as downstream and upstream optical flows in the optical communication network, and
- a unit 34 for controlling and managing the optical communication network.

In other terms, the distribution box 30 is advantageously configured to allow on the one hand the concentration and the management of data concerning the various services, coming from the data resource block 10, and on the other hand the allocation of data concerning each service and the control and management of the optical communication network on multiplexed different wavelength channels in the main optical fiber 40.

At the output of the distribution box, the main optical fiber 40 thus transports N (N≥2) multiplexed different wavelength channels. Each service is transmitted by a wavelength channel that is separate from the one of the other channels transmitting the other services as well as the control and the management of the optical communication network. These wavelength channels are transmitted simultaneously in the main optical fiber.

In what follows, the name control and management channel will be used for the wavelength channel carrying data relating to controlling and managing the optical communication network. This control and management channel includes the data concerning the maintenance of the optical communication network, in particular data on the state of health of the fiber. This channel also includes the data concerning the configuration and/or reconfiguration of the optical communication network.

Likewise, the term channel dedicated to a service will be used for the wavelength-division channel carrying data concerning a given service.

The main optical fiber 40 transports at least two wavelength channels, of which always one channel for controlling and managing the optical communication network.

When the distribution box 30 includes a CWDM (Coarse Wavelength Division Multiplexing) multiplexer to multiplex the various wavelengths onto the main optical fiber, said main optical fiber can transport at least ten multiplexed different wavelength channels.

In the non-limiting example shown in FIG. 1, the main optical fiber transmits three multiplexed wavelength channels: the channel $\lambda_1$ dedicated to a first service, the channel $\lambda_2$ dedicated to a second service, the control and management channel $\lambda_3$.

The main optical fiber 40 of the optical communication network is preferably single-mode. A single-mode optical fiber authorizes for example speeds per data carrier wavelength concerning a given service of about 10, 25, 40 or 100 Gbps. However, nothing excludes having recourse to a main multimode optical fiber.

The distribution box 30 is connected to the various items of equipment of the cabin 101 via optical backplanes 50 mounted in series.

The main optical fiber 40 successively serves the optical backplanes 50 of the optical communication network architecture 20.

Each optical backplane 50 is in addition electrically and optically coupled to an interface box 60, itself electrically coupled (double arrow 61) to an item or items of equipment 70. In an alternative embodiment, the interface box 60 can be optically coupled to an item or items of equipment 70.

An interface box 60 is intended to allow for the transmission of data concerning the services required to the associated item or items of equipment. The interface box 60 includes in particular an optical/electrical signal conversion unit (not shown).

For example, an interface box 60 can be electrically coupled to an item of equipment 70 disposed at a passenger seat or, alternatively, to items of equipment disposed in a row of passenger seats or several rows of passenger seats.

Figure 2:
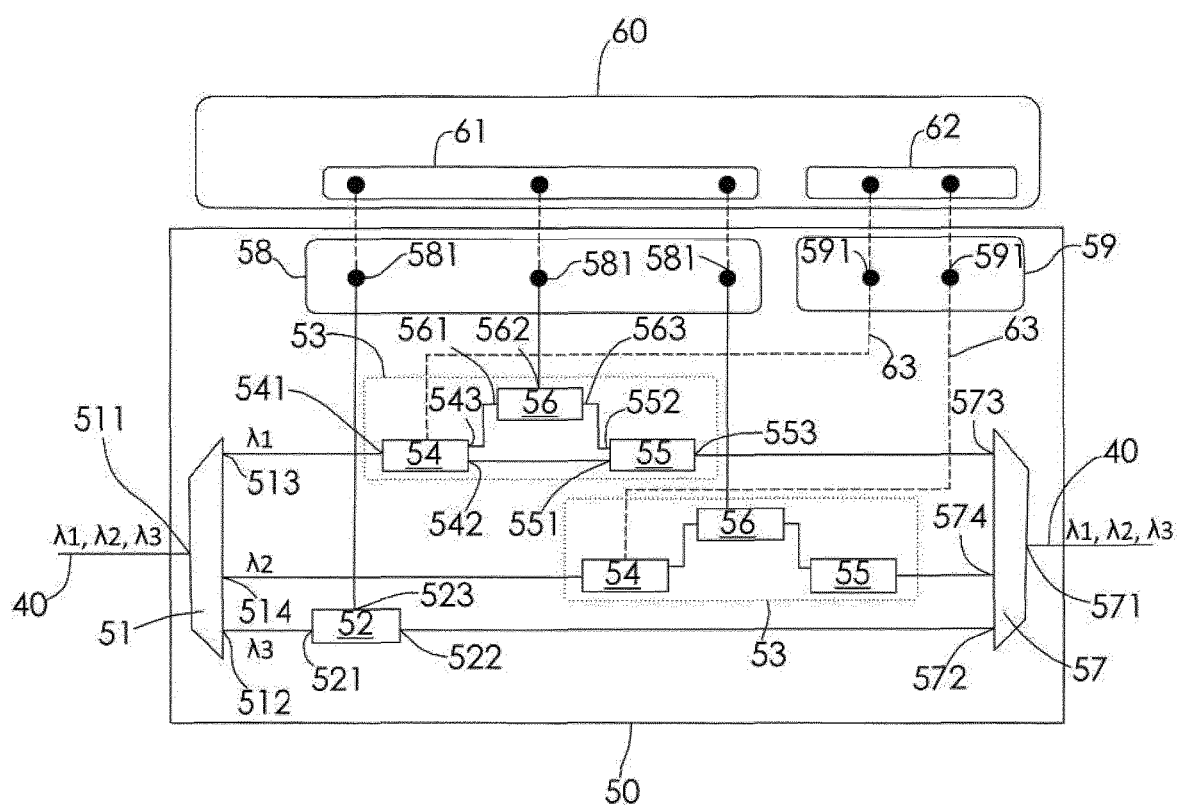
FIG. 2 shows an example of an optical backplane according to an embodiment of the invention.

An optical backplane 50 includes, as shown in FIG. 2:
an optical wavelength demultiplexer, referred to as demultiplexer 51, an optical wavelength multiplexer, referred to as multiplexer 57, an optical coupler 1×2, referred to as first coupler 52, and at least one routing device 53.

The demultiplexer 51 is coupled as input to the main optical fiber 40. It advantageously makes it possible to separate the multiplexed different wavelength channels transported by said main optical fiber.

The demultiplexer 51 receives, at an input port 511, the main optical fiber 40 transporting the multiplexed different wavelength channels:

the control and management channel $\lambda_3$, and at least one channel $\lambda_1$, $\lambda_2$ dedicated to a given service.

The demultiplexer 51 distributes as output the various wavelength channels in the output ports 512, 513, 514 according to the wavelength.

The demultiplexer 51 includes at least as many output ports as multiplexed wavelength channels transported by the main optical fiber. Preferably, the demultiplexer chosen includes a number of output ports that corresponds to the maximum number of multiplexed wavelength channels transported by the main optical fiber. According to the number of multiplexed wavelength channels transported by the main optical fiber, all or a portion of the output ports will be used. Such a choice allows for latitude on the number of multiplexed wavelength channels transported by the main optical fiber.

In the non-limiting example of FIG. 2, the main optical fiber 40 transports three channels $\lambda_1$, $\lambda_2$, $\lambda_3$ and the demultiplexer 51 includes three output ports:

a first output port 512 delivering the control and management channel $\lambda_3$, a second output port 513 delivering a channel $\lambda_1$ dedicated to a first service, and a third output port 514 delivering a channel $\lambda_2$ dedicated to a second service.

The first coupler 52 is configured to receive as input the control and management channel $\lambda_3$ and transmit on the one hand a portion of the control and management channel $\lambda_3$ to the interface box 60 to which the optical backplane 50 is optically coupled and on the other hand, the other portion of the control and management channel $\lambda_3$ to a first input port 572 of the multiplexer 57.

The first coupler 52 includes:

an input port 521 able to receive the control and management channel $\lambda_3$, coming from the first output port 512 of the demultiplexer 51, a first output port 522 able to transmit the control and management channel $\lambda_3$ to the first input port 572 of the multiplexer 57, and a second output port 523 able to transmit the control and management channel $\lambda_3$ to the interface box 60 associated with the optical backplane 50.

Thus, the first coupler 52 always transmits the control and management channel $\lambda_3$, to both the interface box 60 associated with the backplane 50 and to the multiplexer 57.

The optical backplane 50 includes, for each output port 513, 514 of the demultiplexer 51 delivering a channel dedicated to a service, a routing device 53. A routing device 53 is configured to receive as input only one channel dedicated to a service.

In the example described in FIG. 2, the optical backplane 50 comprises two routing devices 53, one for the channel $\lambda_1$ dedicated to a first service and one for the channel $\lambda_2$ dedicated to a second service.

All the routing devices 53 of an optical backplane 50 are identical.

In the rest of the description, only a routing device 53, the one associated with the channel $\lambda_1$ dedicated to a first service, will be described. The routing device 53 associated with the channel $\lambda_2$ dedicated to a second service is deduced by analogy.

The routing device 53 is configured to receive, as input, the channel $\lambda_1$ dedicated to the first service. It is configured, as output, to:

in a first position, transmit the channel $\lambda_1$ dedicated to the first service to a second input port 573 of the multiplexer 57, and in a second position, transmit on the one hand a portion of the channel $\lambda_1$ dedicated to the first service to the interface box 60, and on the other hand, the other portion of the channel $\lambda_1$ dedicated to the first service to the second input port 573 of the multiplexer.

In an embodiment of the routing device 53, said routing device includes an optical switch 1×2 (or switch 1×2), referred to as switch 54, and two optical couplers 1×2, referred to as second coupler 55 and third coupler 56.

The switch 54 receives, via an input port 541, the channel $\lambda_1$ dedicated to the first service. The switch 54, at a first output port 542, is coupled to a first input port 551 of the second coupler 55.

A second output port 543 of the switch 54 is coupled to an input port 561 of the third coupler 56.

The third coupler 56 is coupled, by a first output port 562, to the interface box 60 and, by a second output port 563, to a second input port 552 of the second coupler 55.

The second coupler 55 includes an output port 553 coupled to the second input port 573 of the multiplexer 57.

The second coupler 55 receives the channel $\lambda_1$ dedicated to the first service either from the third coupler 56, or from the switch 54, and transmits as output said channel $\lambda_1$ dedicated to the first service to the second input port 573 of the multiplexer 57.

The switch 54, according to the position of the routing device, transmits the channel $\lambda_1$ dedicated to the first service either to the second coupler 55 or to the third coupler 56.

When the routing device 53 is in the first position, the switch 54 transmits the channel $\lambda_1$ dedicated to the first service only to the second coupler 55, which transmits it to the multiplexer 57.

When the routing device 53 is in the second position, the switch 54 transmits the channel $\lambda_1$ dedicated to the first service only to the third coupler 56. This third coupler 56 transmits a portion of the channel $\lambda_1$ dedicated to the first service to the interface box 60 and the other portion of the channel $\lambda_1$ dedicated to the first service to the second coupler 55, which transmits it to the multiplexer 57.

Thus, regardless of the position of the routing device, said routing device always transmits at least one portion of the channel $\lambda_1$ dedicated to the first service to the multiplexer 57. When it is in its second position, the routing device also transmits a portion of the channel $\lambda_1$ dedicated to the first service to the interface box 60.

The routing device 53 is electrically controlled to switch from the first to the second position and reciprocally.

The routing device 53 is advantageously controlled by the interface box 60 with which the backplane 50 is associated, as will be explained hereinafter.

By analogy, the routing device 53 that receives as input the channel $\lambda_2$ dedicated to the second service is configured to:

in a first position, transmit the channel $\lambda_2$ dedicated to the second service to a third input port 574 of the multiplexer 57, and in a second position, transmit on the one hand a portion of the channel $\lambda_2$ dedicated to the second service to the interface box 60, and on the other hand, the other portion of the channel $\lambda_2$ dedicated to the second service to the third input port 574 of the multiplexer.

The multiplexer 57 combines the various wave channels received via its input ports 572, 573, 574. In the example of FIG. 2, the multiplexer 57 combines the channels $\lambda_1, \lambda_2, \lambda_3$. At the output of said multiplexer, the various wavelength channels are multiplexed and transported by the main optical fiber 40 of the optical communication network. The main optical fiber 40 transports the various multiplexed wavelength channels to the following optical backplane 50, associated with another interface box 60 serving other items of equipment 70.

The couplings between the various optical components (multiplexer, demultiplexer, couplers, switches) of the optical backplane 50 are advantageously carried out by optical waveguides, for example optical fibers.

In an embodiment of the optical backplane 50, said backplane can be carried out in the form of a photonic integrated circuit (PIC). Such a photonic integrated circuit is perfectly suited for high-speed optical communications.

To summarize, all the optical backplanes 50 of the optical communication network architecture 20 successively receive the main optical fiber 40 transporting the multiplexed different wavelength channels.

All the interface boxes 60 of the optical communication network architecture 20 receive the control and management channel $\lambda_3$, via the first coupler. Recall that this control and management channel $\lambda_3$ includes in particular the data on the state of health of the main optical fiber 40 as well as on the state of health of the backplanes 50. The state of health of the main optical fiber and of the backplanes can for example be controlled by optical time domain reflectometry OTDR or by optical frequency domain reflectometry OFDR. This control and management channel $\lambda_3$ also includes the data relating to the configuration and/or reconfiguration of the optical communication network. In other terms, this control and management channel $\lambda_3$ includes in particular all the information relating to the needs of each item of equipment 70, associated with the optical communication network architecture 20, with respect to such and such a service proposed in the plane. More precisely, this control and management channel $\lambda_3$ includes control information of each routing device, and by extension of switches 54.

Thus, each interface box 60 transmits an electrical control signal of the routing device or devices 53 of the associated backplane, according to the information contained in the control and management channel $\lambda_3$. More precisely, the interface box 60 transmits an electrical control signal 63 to the switch of the routing device 53.

As explained hereinabove, each optical backplane 50 is optically and electrically coupled to the associated interface box 60.

On the one hand, the optical backplane 50 is optically coupled to the interface box 60 in order to allow for the transmission of each one of the wavelength channels to said interface box. On the other hand, the optical backplane 50 is electrically coupled to the interface box 60 in order to allow said interface box to electrically control the switch 54 of the routing device or devices 53.

As shown in FIG. 2, the optical backplane 50 can for example include an optical connector 58 that groups together several output points 581, with an output point being connected to an optical fiber transporting either a wavelength channel dedicated to a service or a control and management wavelength channel. The number of output points 581 is preferably equivalent to the number of optical fibers exiting the demultiplexer 51.

The optical backplane 50 can include an electrical connector 59 that groups together several output points 591. At a minimum, the number of output points 591 is equal to the number of routing devices 53 in the optical backplane 50.

The interface box 60 will include an optical connector 61 and an electrical connector 62 complementary to those of the associated optical backplane.

In the example of FIG. 2, the optical backplane 50 includes an optical connector 58 with three output points 581 and an electrical connector 59 with two output points 591.

The distribution box, the optical fiber, the backplanes and the interface boxes form the optical communication network architecture.

Operating Principle of the Optical Backplane

In an embodiment, by default, all the routing devices 53 are configured in the first position.

During a first configuration or a reconfiguration of the optical communication network, all of the data concerning this configuration or reconfiguration, in particular which service to attribute to which item of equipment, is grouped together and managed beforehand by the unit 34 for controlling and managing the optical communication network and transmitted onto the main optical fiber, via the control and management channel $\lambda_3$.

The data carried by the control and management channel $\lambda_3$ is transmitted, via the first coupler 52, to the interface box 60 associated with the backplane 50. The data is decoded by the interface box 60. When the data contains information that such an item of equipment 70 coupled to the interface box 60 needs from such service, said interface box transmits an electrical control signal to the routing device 53 receiving the wavelength channel dedicated to this service, so that it switches to the second position so as to be able to address said service to said item of equipment.

The interface box 60 thus electrically activates the switch 54 of the routing device 53.

Such an optical backplane 50 advantageously allows for a reconfiguration of the optical communication network without a modification of the optical communication network architecture 20 with which it is associated.

When it is desired to no longer address a particular service to an item of equipment 70, this information is transmitted via the control and management channel $\lambda_3$. The interface box 60 associated with this item of equipment 70, when it receives the control and management channel $\lambda_3$, transmits an instruction to the routing device 53 receiving the wavelength channel dedicated to this particular service, to switch in the first position so as to no longer address this service to this item of equipment.

In addition, it is also possible, via this optical backplane 50, to connect a new item of equipment 70 in the optical communication network architecture 20, without having to review the topology of the optical communication network. The new item of equipment 70 is then advantageously connected to an interface box already present in the optical communication network architecture. The information on the attribution of services to this new item of equipment is transmitted via the control and management channel $\lambda_3$. The interface box 60, connected to this new item of equipment, when it receives the control and management channel $\lambda_3$, transmits or not, an instruction to the routing devices 53 each one receiving a specific service so as to address, or not, said service or services to this new item of equipment.

The invention claimed is:

1. An optical backplane for an optical communication network architecture distributing data to equipment, comprising:
   an optical wavelength demultiplexer comprising:
      an input port coupled to an optical fiber to carry at least two multiplexed channels of different wavelengths, a control and management wavelength channel carrying data relating to controlling and managing an optical communication network, and at least one service dedicated wavelength channel carrying data concerning a service for at least one item of equipment; and
      at least two output ports configured to deliver, each, respectively the control and management wavelength channel and said at least one service dedicated wavelength channel;
   an optical wavelength multiplexer;
   a coupler configured to receive, from a first output port of the optical wavelength demultiplexer, the control and management wavelength channel and transmit a first portion of the control and management wavelength channel to an interface box coupled to said at least one item of equipment, and a second portion of the control and management wavelength channel to the optical wavelength multiplexer;
   a routing device for each output port of the optical wavelength demultiplexer to deliver a service dedicated wavelength channel, each routing device being configured to: receive the service dedicated wavelength channel; and in a first position, transmit the service dedicated wavelength channel to the optical wavelength multiplexer, and in a second position, transmit a first portion of the service dedicated wavelength channel to the interface box and a second portion of the service dedicated wavelength channel to the optical wavelength multiplexer; and
   wherein the optical wavelength multiplexer is configured to combine and wavelength-division multiplex the control and management wavelength channel and said at least one service dedicated wavelength channel onto the optical fiber.

2. The optical backplane of claim 1, wherein said each routing device is configured to switch from the first position to the second position, and reciprocally, on instruction from the interface box.

3. The optical backplane of claim 1, wherein said each routing device comprises a switch 1×2 and two optical couplers 2×1, an optical coupler 2×1 at each output port of the switch 1×2.

4. The optical backplane of claim 1, wherein the optical wavelength demultiplexer, the optical wavelength multiplexer, the coupler and said each routing device are integrated into a photonic integrated circuit.

5. An optical communication network architecture comprising a distribution box to allocate data concerning services and the control and management of the optical communication network on multiplexed different wavelength channels over the optical fiber and optical backplanes of claim 1, the optical fiber successively serving each optical backplane, said each optical backplane being coupled to the interface box.

6. The optical communication network architecture of claim 5, wherein the interface box is electrically connected to said each routing device of an associated backplane to control said each routing device according to the data contained in the control and management channel received by the interface box.

* * * * *